US010434697B2

(12) United States Patent
Suzuki et al.

(10) Patent No.: US 10,434,697 B2
(45) Date of Patent: Oct. 8, 2019

(54) LINER-TYPE BARREL

(71) Applicant: Toshiba Kikai Kabushiki Kaisha, Chiyoda-ku, Tokyo (JP)

(72) Inventors: Shozo Suzuki, Mishima (JP); Masatoshi Ohara, Numazu (JP); Yasuhiro Maekawa, Numazu (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 0 days.

(21) Appl. No.: 15/818,871

(22) Filed: Nov. 21, 2017

(65) Prior Publication Data
US 2018/0093407 A1 Apr. 5, 2018

Related U.S. Application Data

(63) Continuation of application No. PCT/JP2016/067430, filed on Jun. 10, 2016.

(30) Foreign Application Priority Data

Jun. 15, 2015 (JP) .................. 2015-120261

(51) Int. Cl.
B29C 48/68 (2019.01)
B29C 48/80 (2019.01)
(Continued)

(52) U.S. Cl.
CPC ........ B29C 48/682 (2019.02); B29C 48/2565 (2019.02); B29C 48/6801 (2019.02);
(Continued)

(58) Field of Classification Search
CPC .............. B29C 47/662; B29C 47/0827; B29C 47/0847; B29C 47/822; B29C 47/825;
(Continued)

(56) References Cited

U.S. PATENT DOCUMENTS 3,590,429 A * 7/1971 Bammert ............ B29C 47/0847
366/84
4,028,027 A * 6/1977 Worz .................. B29C 47/0847
418/201.1
(Continued)

FOREIGN PATENT DOCUMENTS

GB 2045628 A * 11/1980 ............ B01F 15/065
JP 58-049230 3/1983
(Continued)

OTHER PUBLICATIONS

International Search Report issued in PCT/JP2016/067430 dated Jul. 26, 2016.
(Continued)

Primary Examiner — Charles Cooley
(74) Attorney, Agent, or Firm — DLA Piper LLP US

(57) ABSTRACT

A barrel main body, a sleeve, and a fixing mechanism (a fastening hole and a fastening device) are provided. The barrel main body includes a barrel hole having a cylindrical shape and a slit dividing an inner circumferential surface of the barrel hole. The sleeve having a hollow cylindrical shape is removably incorporated into the barrel hole. The slit includes two cutout surfaces facing each other with a space between. The fixing mechanism brings the inner circumferential surface of the barrel hole into close contact with the sleeve without any gap by narrowing the space between the cutout surfaces and deforming the barrel main body.

10 Claims, 4 Drawing Sheets

(51) Int. Cl.
 *B29C 48/25* (2019.01)
 *B29C 48/40* (2019.01)
 *B29C 48/92* (2019.01)

(52) U.S. Cl.
 CPC ........ *B29C 48/832* (2019.02); *B29C 48/834* (2019.02); *B29C 48/40* (2019.02); *B29C 48/92* (2019.02); *B29C 2948/924* (2019.02); *B29C 2948/92209* (2019.02); *B29C 2948/92704* (2019.02); *B29C 2948/92971* (2019.02)

(58) Field of Classification Search
 CPC ........ B29C 2947/92704; B29C 2947/92971; B29C 2947/92209; B29C 2947/924; B29C 47/92; B29C 47/40; B29C 47/0835; B29C 48/682; B29C 48/832; B29C 48/2565; B29C 48/6801; B29C 48/834; B29C 2948/92971; B29C 48/92; B29C 2948/92704; B29C 2948/924; B29C 2948/92209; B29C 48/40; B29L 2031/757
 USPC ........ 366/69, 147, 149; 165/109.1; 425/547, 425/550, 378.1
 See application file for complete search history.

(56) References Cited

U.S. PATENT DOCUMENTS

| | | | | |
|---|---|---|---|---|
| 4,702,695 | A * | 10/1987 | Blach | B29C 47/822 219/390 |
| 5,667,299 | A * | 9/1997 | Mizoguchi | B01F 15/065 366/144 |
| 7,585,101 | B2 * | 9/2009 | Watanabe | B29C 47/0002 366/69 |
| 8,827,538 | B2 * | 9/2014 | Padmanabhan | B01F 15/00928 366/79 |
| 2005/0259507 | A1 * | 11/2005 | Ronkin | B22D 19/0072 366/69 |
| 2015/0158232 | A1 * | 6/2015 | Holmes | B29C 47/0011 138/141 |
| 2018/0093407 | A1 * | 4/2018 | Suzuki | B29C 47/662 |

FOREIGN PATENT DOCUMENTS

| | | |
|---|---|---|
| JP | 59-15525 | 1/1984 |
| JP | S59-124114 | 8/1984 |
| JP | S62-261095 | 9/1987 |
| JP | H1-72317 | 5/1989 |
| JP | H3-81129 | 4/1991 |
| JP | 3-66632 | 6/1991 |
| JP | 5-74813 | 10/1993 |
| JP | 11-115015 | 4/1999 |

OTHER PUBLICATIONS

Written Opinion issued in PCT/JP2016/067430 dated Jul. 26, 2016.
International Preliminary Report on Patentability issued in PCT/JP2016/067430 dated Jul. 26, 2016.
English language Abstract of JP 58-049230 published Mar. 23, 1983.
Office Action in JP Application No. 2015-120261 dated May 7, 2019.

* cited by examiner

LINER-TYPE BARREL

CROSS-REFERENCE TO RELATED APPLICATIONS

This application is a Continuation application of PCT Application No. PCT/JP2016/067430, filed Jun. 10, 2016 and based upon and claiming the benefit of priority from prior Japanese Patent Application No. 2015-120261, filed Jun. 15, 2015, the entire contents of all of which are incorporated herein by reference.

BACKGROUND OF THE INVENTION

1. Field of the Invention

The present invention relates to a liner-type barrel. The liner refers to a hollow sleeve that is removably incorporated into the barrel. The sleeve refers to a cylindrical part that is incorporated into the barrel, thereby allowing a cylinder to be integrally formed in the barrel. The cylinder refers to a hollow duct into which one or more screws are rotatably inserted.

2. Description of the Related Art

In the technical field of liner-type barrels, a technique of forming a cylinder in a barrel by incorporating a sleeve in which a twin-axis hole is formed into the barrel has been known (see, for example, Patent Literature 1). In the technique, the sleeve has such a sectional shape as covers the twin-axis hole (for example, a prolate ellipsoidal shape or an oval [egg] shape). The sleeve is incorporated into a barrel hole formed in the barrel. As a method of incorporation, shrink-fitting or cooling-fitting is applied.

In the method of shrink-fitting, the barrel is heated to expand the barrel hole. The sleeve is inserted into the barrel hole that has expanded. They are left as they are in an environment at a normal temperature. During this process in which they are left, the barrel is restored to an initial shape that the barrel had before it is heated. That is, the barrel hole shrinks. The barrel hole and the sleeve are thereby pressed against each other. As a result, the sleeve is incorporated and fixed in the barrel hole.

In cooling-fitting, the sleeve is cooled to make the sleeve contract smaller than the barrel hole. The sleeve that has contracted is inserted into the barrel hole. They are left as they are in an environment at a normal temperature. During this process in which they are left, the sleeve is restored to an initial shape that the sleeve had before it is cooled. That is, the sleeve expands. The barrel hole and the sleeve are thereby pressed against each other. As a result, the sleeve is incorporated and fixed in the barrel hole.

CITATION LIST

Patent Literature

Patent Literature 1: JP S58-49230 A

BRIEF SUMMARY OF THE INVENTION

Technical Problem

Incidentally, according to the above-described method of incorporation (shrink-fitting or cooling-fitting), large-scale facilities and many workers are needed separately in order to execute the method. Thus, the cost for incorporating the sleeve into the barrel will increase. Especially, the operation of heating the barrel or the operation of cooling the sleeve, and the subsequent operation of leaving them as they are, not only take a lot of time, but also require that spaces for the operations be secured. Thus, the sleeve cannot be efficiently incorporated into the barrel. In addition, the contours of the above sleeve and barrel hole have a prolate ellipsoidal shape or an oval (egg) shape. To process the sleeve and the barrel hole into such a shape is laborious and troublesome. Thus, the processing cost increases.

An object of the present invention is to provide a liner-type barrel into which a sleeve can be easily and efficiently incorporated at low cost without the need to perform shrink-fitting or cooling-fitting.

Solution to Problem

To achieve the object, the liner-type barrel of the present invention comprises a barrel main body, a sleeve, and a fixing mechanism (a fastening hole and a fastening device). The barrel main body comprises a barrel hole having a cylindrical shape and a slit dividing an inner circumferential surface of the barrel hole. The sleeve having a hollow cylindrical shape is removably incorporated into the barrel hole. The slit comprises two cutout surfaces facing each other with a space between. The fixing mechanism brings the inner circumferential surface of the barrel hole into close contact with the sleeve without any gap by narrowing the space between the cutout surfaces and deforming the barrel main body.

Advantageous Effects of Invention

According to the present invention, a liner-type barrel into which a sleeve can be easily and efficiently incorporated at low cost without the need to perform shrink-fitting or cooling-fitting can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One Embodiment

Figure 1:
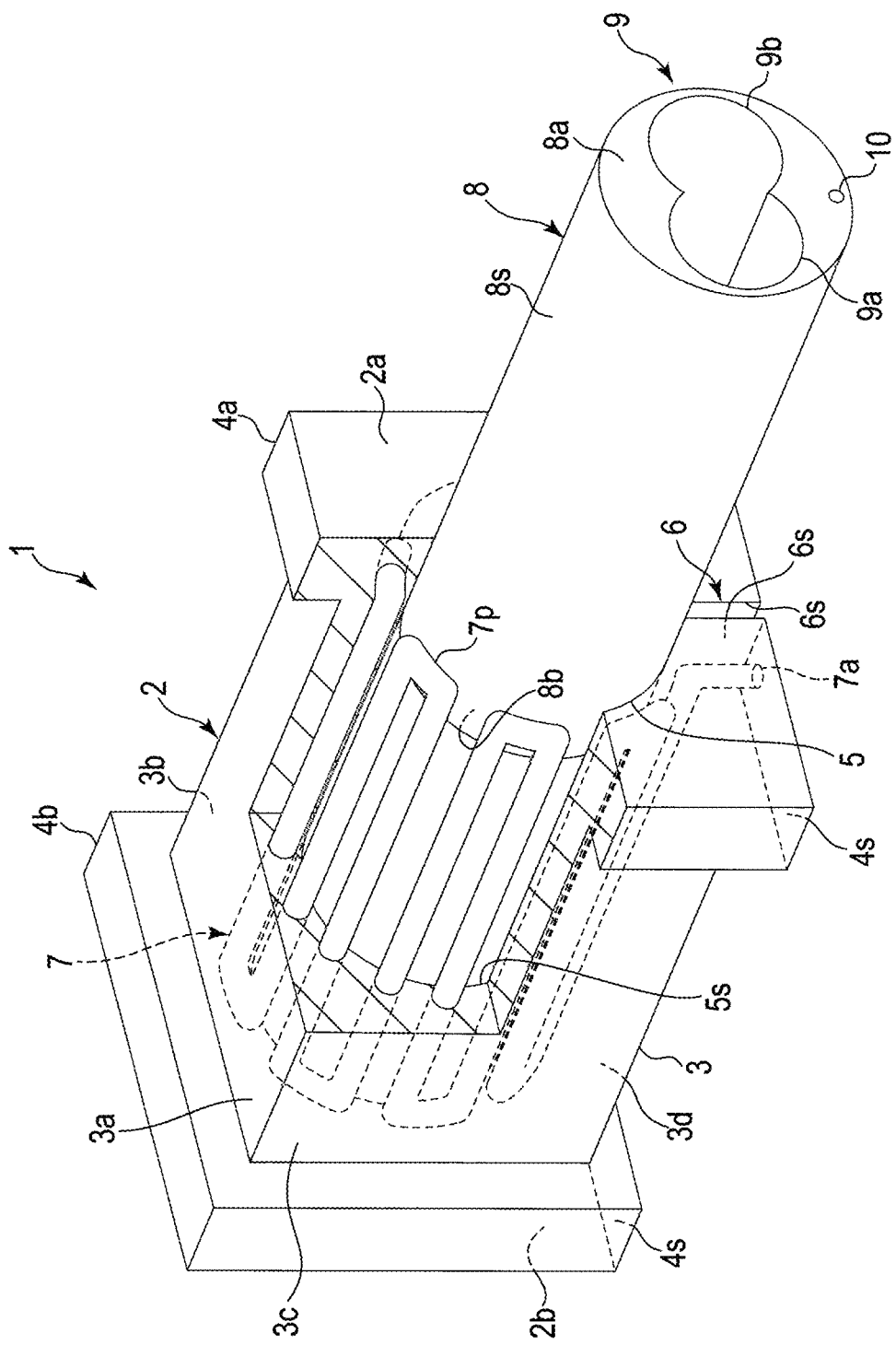
FIG. 1 is a perspective view showing a partly sectional structure of a liner-type barrel according to one embodiment.
Figure 2:
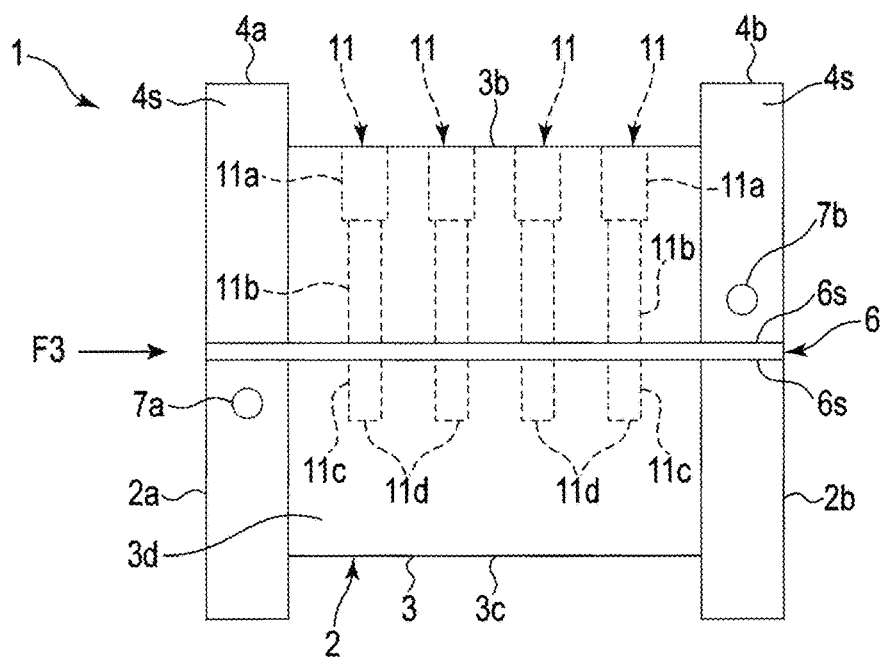
FIG. 2 is a bottom view of the liner-type barrel of FIG. 1.
Figure 3:
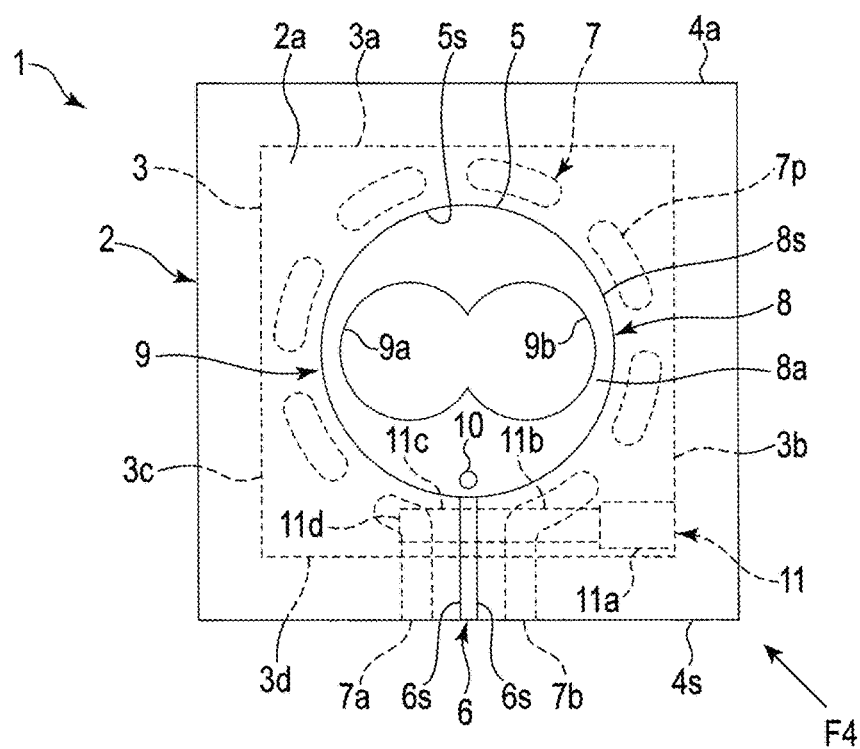
FIG. 3 is a side view from a direction F3 of FIG. 2.
Figure 4:
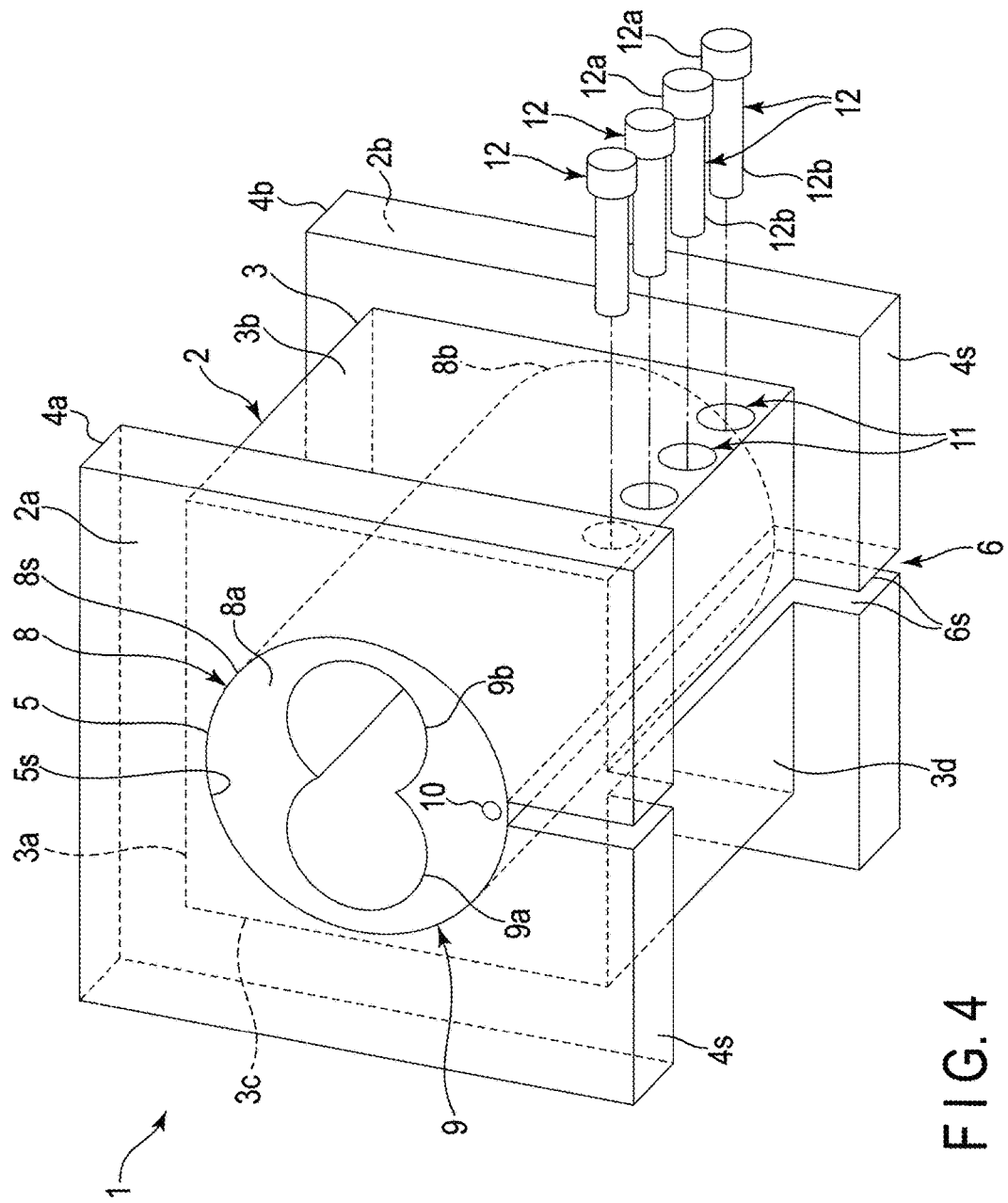
FIG. 4 is a perspective view from a direction F4 of FIG. 3.

A liner-type barrel according to a present embodiment is formed to allow a cylinder to be integrated into the barrel by making a liner (that is, a hollow sleeve) removably incorporated into the barrel. The cylinder functions as a hollow duct. One or more screws are rotatably inserted into the hollow duct. In the following, a cylinder into which two screws are rotatably inserted will be assumed as an example of the cylinder.

The liner-type barrel according to the present embodiment is integrated by combining barrel blocks 1 (refer to FIG. 1 to FIG. 4) with each other. In this case, the number of barrel blocks 1 to be combined is increased or decreased. A cylinder that corresponds to the length of screws to be used thereby can be formed in the one continuous barrel formed of the barrel blocks 1. It should be noted that the accompanying drawings show the structure of a part of the barrel, that is, one barrel block 1.

[Structure of Barrel Blocks 1 (Barrel)]

[Barrel Main Body 2] As shown in FIG. 1 to FIG. 4, the barrel blocks 1 each comprise a barrel main body 2.

The barrel main body 2 is formed to have a contour in the shape of a cube or a rectangular parallelepiped. The barrel main body 2 comprises end surfaces 2a and 2b facing each other, and an outer surface 3 covering a space between the end surfaces 2a and 2b. The end surfaces 2a and 2b are disposed to be parallel to each other. The outer surface 3 is formed by integrating rectangular four flat surfaces 3a, 3b, 3c, and 3d continuously.

As the four flat surfaces, for example, the top surface 3a, the first side surface 3b, the second side surface 3c, and the bottom surface 3d are defined. The top surface 3a and the bottom surface 3d are disposed to be parallel to each other. The first side surface 3b and the second side surface 3c are disposed to be parallel to each other. The top and bottom surfaces 3a and 3d and the first and second side surfaces 3b and 3c have the positional relationship in which they are orthogonal to each other.

The barrel main body 2 comprises two flanges 4a and 4b. The flanges 4a and 4b project outward from the outer surface 3 of the barrel main body 2. The flanges 4a and 4b are formed to be disposed along the same planes as the two end surfaces 2a and 2b. The flanges 4a and 4b have rectangular contours.

According to the above-described structure, the flanges 4a and 4b of the adjacent barrel main bodies 2 are fastened to each other in a state in which the barrel blocks 1 are arranged in one direction. The one continuous barrel into which the barrel blocks 1 are integrated thereby can be formed.

Here, as a method of fastening the flanges 4a and 4b to each other, for example, a technique of fastening them by combining bolts and nuts, which are not particularly shown in the figures, can be applied. In this case, through-holes (not shown in the figures) are provided at intervals in the flanges 4a and 4b. The through-holes are formed to penetrate the flanges 4a and 4b.

In this structure, the through-holes of the adjacent flanges 4a and 4b are positioned to face each other in a state in which the barrel blocks 1 are arranged in one direction. The bolts are inserted along the through-holes facing each other. The nuts are screwed onto the tips of the inserted bolts. The flanges 4a and 4b thereby can be fastened to each other. As a result, the barrel blocks 1 can be integrated.

[Barrel Hole 5]

The barrel blocks 1 each comprise a barrel hole 5. The barrel hole 5 is provided in the barrel main body 2. The barrel hole 5 is formed to allow a liner (hereinafter, referred to as a sleeve 8), which will be described later, to be removably incorporated thereinto. To be specific, the barrel hole 5 extends straight to penetrate the space between the above-described two end surfaces 2a and 2b. The barrel hole 5 comprises an inner circumferential surface 5s having a cylindrical shape.

It is preferable that the inner dimension (that is, the inside diameter) of the barrel hole 5 (the inner circumferential surface 5s) is set to be equal to the outside diameter (that is, the diameter) of the sleeve 8 or to be slightly greater than the outside diameter (the diameter) of the sleeve 8. The sleeve 8 thereby can be removably inserted (incorporated) into the barrel hole 5 easily and smoothly.

[Slit 6]

The barrel blocks 1 each comprise a slit 6. The slit 6 is provided in the barrel main body 2. To be specific, the slit 6 is formed by cutting out a part of the barrel main body 2. In other words, the slit 6 is formed in a portion remaining when the part of the barrel main body 2 has been cut out. In the remaining portion, the slit comprises two cutout surfaces 6s.

The cutout surfaces 6s have an even and flat shape. The cutout surfaces 6s face and are parallel to each other with a space between. The cutout surfaces 6s are formed straight continuously from the outer surface 3 of the barrel main body 2 to the barrel hole 5. In the figures, as an example, the cutout surfaces 6s are formed straight continuously from the bottom surface 3d of the barrel main body 2 and bottom surfaces 4s of the two flanges 4a and 4b to the barrel hole 5.

The slit 6 is formed to divide the inner circumferential surface 5s of the barrel hole 5. The inner circumferential surface 5s of the barrel hole 5 is divided by a gap between the two cutout surfaces 6s. A direction in which the barrel hole 5 is divided by the gap extends straight in a direction along the space between the above-described two end surfaces 2a and 2b. The width of the space between the cutout surfaces 6s (that is, the size of the gap or the width of the slit 6) is set according to, for example, the size, the shape, and the material of the barrel main body 2, and the size of the barrel hole 5. Thus its numerical value is not particularly limited herein.

The slit 6 is provided in a position avoiding a cooling water path 7 (a duct 7p), which will be described later. The slit 6 is formed in such a way that an introduction port 7a and a discharge port 7b, which will be described later, are disposed on both sides of the slit 6. In the figures, as an example, the slit 6 (gap) is formed by making the above-described two cutout surfaces 6s extend parallel to each other and straight. The introduction port 7a and the discharge port 7b are disposed on the bottom surfaces 4s of the two flanges 4a and 4b, respectively, on both sides of the straight slit 6 (gap).

In this manner, the barrel hole 5 is divided by the slit 6 (gap), and thus, it becomes easier to elastically deform the barrel main body 2. At the same time, it becomes easier to expand and deform the barrel hole 5. The barrel hole 5 is thereby expanded and deformed when the sleeve 8 is incorporated into the barrel hole 5. As a result, the sleeve 8 can be removably incorporated into the barrel hole 5 easily and smoothly.

[Other Structures of Barrel Main Body 2]

The barrel blocks 1 each comprise the cooling water path 7, a heater and a temperature sensor not shown in the figures, etc. The cooling water path 7 is capable of cooling the barrel main body 2. The heater is capable of heating the barrel main body 2. The heater is provided on the outer surface 3 of the barrel main body 2. In this case, the barrel main body 2 can be heated up to a preset temperature by turning the heater on and off. Here, if the temperature of the barrel main body 2 exceeds the set temperature, the barrel main body 2 can be cooled to the preset temperature by making cooling water flow through the cooling water path 7.

The cooling water path 7 is continuously formed to surround the above-described barrel hole 5. The cooling water path 7 is composed of the one continuous duct 7*p*. The cooling water path 7 (the duct 7*p*) is laid in a circumferential direction along the barrel hole 5 while shuttling between the above-described two end surfaces 2*a* and 2*b* alternately inside the barrel main body 2.

The cooling water path 7 (the duct 7*p*) comprises the introduction port 7*a* and the discharge port 7*b*. The introduction port 7*a* and the discharge port 7*b* are provided at both ends of the cooling water path 7 (the duct 7*p*). That is, the introduction port 7*a* is provided at one end of the cooling water path 7 (the duct 7*p*), and the discharge port 7*b* is provided at the other end of the cooling water path 7 (the duct 7*p*). The introduction port 7*a* is capable of introducing cooling water into the cooling water path 7 (the duct 7*p*). The discharge port 7*b* is capable of discharging cooling water that has passed through the cooling water path 7 (the duct 7*p*).

The introduction port 7*a* and the discharge port 7*b* can be opened at the outer surface 3 (the top surface 3*a*, the first side surface 3*b*, the second side surface 3*c*, and the bottom surface 3*d*) of the barrel main body 2, or at the surfaces of the two flanges 4*a* and 4*b*. In the figures, as an example, the introduction port 7*a* and the discharge port 7*b* are opened at the bottom surfaces 4*s* of the flanges 4*a* and 4*b*, respectively, of the surfaces of both the flanges 4*a* and 4*b*. To be specific, the introduction port 7*a* is opened at the bottom surface 4*s* of the one flange 4*a*. The discharge port 7*b* is opened at the bottom surface 4*s* of the other flange 4*b*. The bottom surfaces 4*s* of both the flanges 4*a* and 4*b* are formed to be parallel to the bottom surface 3*d* of the barrel main body 2.

[Sleeve 8]

The barrel blocks 1 each comprise the sleeve 8. The sleeve 8 has such a contour as can be removably incorporated into the barrel main body 2 (the barrel hole 5). To be specific, the sleeve 8 comprises an outer circumferential surface 8*s* having a cylindrical shape. The sleeve 8 is set to a length equal to the distance between the end surfaces 2*a* and 2*b* of the barrel main body 2, or a length which makes both sides of the sleeve 8 slightly project from the end surfaces 2*a* and 2*b*. The length of the sleeve 8 can be defined as the total length between both the end surfaces 8*a* and 8*b* of the sleeve 8. The sleeve 8 extends straight over its total length.

The sleeve 8 comprises a hollow cylinder portion 9. The cylinder portion 9 is formed to extend between both the end surfaces 8*a* and 8*b* of the sleeve 8. In the cylinder portion 9, two cylinder paths 9*a* and 9*b* having a hollow cylindrical shape are formed. The cylinder paths 9*a* and 9*b* extend to penetrate both the end surfaces 8*a* and 8*b* of the sleeve 8. The cylinder paths 9*a* and 9*b* extend straight while being parallel and adjacent to each other. The cylinder paths 9*a* and 9*b* extend with adjacent portions thereof overlapping each other. Screws (not shown in the figures) can be inserted into the cylinder paths 9*a* and 9*b*, respectively. In a state in which the screws are inserted in the cylinder paths 9*a* and 9*b*, the screws can rotate in the same direction (different directions).

According to the above-described sleeve 8, the sleeve 8 is inserted (incorporated) into the barrel hole 5. The sleeve 8 is fixed in the barrel hole 5 by a fixing mechanism, which will be described later. The cylinder as a hollow duct, into which the screws are rotatably inserted, thereby can be integrated into the barrel main body 2 (barrel).

[Positioning Mechanism]

The barrel blocks 1 each comprise a positioning mechanism. The positioning mechanism is capable of incorporating the sleeve 8 into the barrel hole 5 in a fixed orientation. In the figures, a mark 10 for positioning is applied as an example of the positioning mechanism. The mark 10 is provided on both the end surfaces 8*a* and 8*b* of the sleeve 8. The mark 10 is provided at a position which is near the periphery of each of the end surfaces 8*a* and 8*b* and which faces the adjacent portions of the two cylinder paths 9*a* and 9*b*. The shape of the mark 10 can be optionally set to a circle, a rectangle, a triangle, etc. In the figures, the circular mark 10 is shown as an example.

When the sleeve 8 is incorporated into the barrel hole 5, the mark 10 is brought closer to face the above-described slit 6. In the barrel blocks 1, the orientations of the sleeves 8 incorporated in the barrel main bodies 2 thereby can be aligned with each other in the same direction. As a result, the cylinder in which the cylinder paths 9*a* and 9*b* continue straight can be formed in a state in which the barrel blocks 1 (the barrel main bodies 2) are integrated.

As the positioning mechanism, an engagement portion for positioning (not shown in the figures), for example, may be provided between the sleeve 8 and the barrel hole 5 instead of the above-described combination of the mark 10 and the slit 6. The engagement portion is formed to extend along a direction in which the sleeve 8 is inserted into the barrel hole 5. For example, an engagement projection is provided on the outer circumferential surface 8*s* of the sleeve 8. The engagement projection is formed by making a part of the outer circumferential surface 8*s* of the sleeve 8 project along the insertion direction. On the other hand, an engagement depression is provided in the barrel hole 5. The engagement depression is formed by making a part of the inner circumferential surface 5*s* of the barrel hole 5 depressed along the insertion direction.

The engagement depression and the engagement projection are capable of engaging with each other. The respective portions where an engagement projection and an engagement depression are provided of the barrel blocks 1 are set at the same positions. In this case, when the sleeves 8 are incorporated into the barrel holes 5, the engagement projections are made to engage with the engagement depressions. The respective orientations of the sleeves 8 incorporated in the barrel main bodies 2 of the barrel blocks 1 thereby can be positioned in the same direction. As a result, the cylinder in which the cylinder paths 9*a* and 9*b* continue straight can be formed in a state in which the barrel blocks 1 are integrated.

[Fixing Mechanism]

The barrel blocks 1 each comprise the fixing mechanism. The fixing mechanism is capable of fixing the sleeve 8, which is incorporated in the barrel hole 5, in the barrel hole 5. To be specific, the fixing mechanism comprises one or more fastening holes 11 and one or more fastening devices 12. The figures show four fastening holes 11 formed at regular intervals and four fastening devices 12, which can be inserted into the fastening holes 11, respectively, as an example.

The fastening devices 12 are capable of being removably fastened in the fastening holes 11. The fastening devices 12 comprise head portions 12a and axial portions 12b extending from the head portions 12a. The head portions 12a and the axial portions 12b have a cylindrical shape. The head portions 12a are greater in diameter than the axial portions 12b. Screws (for example, male screws) are cut in the outer circumferences of the axial portions 12b.

The fastening holes 11 are formed at positions avoiding the cooling water path 7 (the duct 7p). The fastening holes 11 extend from the outer surface 3 of the barrel main body 2 to penetrate the slit 6 (the gap or both the cutout surfaces 6s). In the figures, the fastening holes 11 extend straight from the first side surface 3b toward the second side surface 3c of the barrel main body 2 of the outer surface 3 of the barrel main body 2 as an example. Extending ends 11d of the fastening holes 11 are set at positions which cross the slit 6 (the gap or both the cutout surfaces 6s) and which do not penetrate the second side surface 3c.

The fastening holes 11 comprise receiving portions 11a, insertion portions 11b extending from the receiving portions 11a, and screw portions 11c facing the insertion portions 11b.

The receiving portions 11a are capable of supporting the head portions 12a of the fastening devices 12 in a state in which the fastening devices 12 are inserted in the fastening holes 11. The receiving portions 11a are formed by making the first side surface 3b of the barrel main body 2 depressed.

The insertion portions 11b are formed to allow the axial portions 12b of the fastening devices 12 to be inserted thereinto. The insertion portions 11b are provided between the receiving portions 11a and the slit 6 (the gap or both the cutout surfaces 6s).

The screw portions 11c are formed to allow the axial portions 12b of the fastening devices 12 to be screwed thereinto. Screws (for example, female screws) are cut in the inner circumferences of the screw portions 11c. The screw portions 11c are provided at positions facing the insertion portions 11b. The screw portions 11c are provided between the slit 6 (the gap or both the cutout surfaces 6s) and the extending ends 11d of the fastening holes 11.

[Process of Assembling Barrel Blocks 1]

For example, the barrel main bodies 2 and the same number of sleeves 8 as the barrel main bodies 2 are prepared. The inside diameter of the barrel holes 5 is set to be equal to or slightly greater than the outside diameter of the sleeves 8. The sleeves 8 are herein inserted into the barrel holes 5. At this time, the marks 10 on both the end surfaces 8a and 8b of the sleeves 8 are brought closer to face the slit 6. The sleeves 8 are positioned in a fixed orientation with respect to the barrel holes 5. Both the end surfaces 8a and 8b of the sleeves 8 are positioned in the same planes as both the end surfaces 2a and 2b of the barrel main bodies 2. Alternatively, both the end surfaces 8a and 8b of the sleeves 8 are made to slightly project from both the end surfaces 2a and 2b of the barrel main bodies 2.

The sleeves 8, which are incorporated in the barrel holes 5, are fixed in the barrel holes 5 by the fixing mechanism. That is, the four fastening devices 12 are inserted into the fastening holes 11, respectively. At this time, the head portions 12a of the fastening devices 12 are supported by the receiving portions 11a of the fastening holes 11. The axial portions 12b of the fastening devices 12 extend from the insertion portions 11b of the fastening holes 11 across the slit 6 (the gap or both the cutout surfaces 6s), and reach the screw portions 11c. In this state, the fastening devices 12 are screwed and fastened. The barrel main bodies 2 are thereby deformed.

To be specific, when the fastening devices 12 are screwed, the screw portions 11c are drawn in the direction of the head portions 12a of the fastening devices 12 with the rotation of the axial portions 12b of the fastening devices 12. At this time, with the screw portions 11c, the peripheral structures of the screw portions 11c are also drawn in the same direction. The space between the cutout surfaces 6s is thereby narrowed. Because of the narrowing of the space, the barrel main bodies 2 having an initial shape are elastically deformed. The initial shape refers to the shape of the barrel main bodies 2 before they are deformed, in other words, the shape of the barrel main bodies 2 before the fixing mechanism is used.

When the barrel main bodies 2 having the initial shape are elastically deformed, the inner circumferential surfaces 5s of the barrel holes 5 are also deformed with the deformation of the barrel main bodies 2. In other words, the narrower the space between the cutout surfaces 6s becomes, the smaller the inside diameter of the barrel holes 5 (the inner circumferential surfaces 5s) becomes. In this case, the cylindrical barrel holes 5 (the inner circumferential surfaces 5s) contract concentrically with the cylindrical sleeves 8. The barrel holes 5 (the inner circumferential surfaces 5s) thereby can be brought into close contact with the sleeves 8 without any gap. At this time, the sleeves 8 are kept in the state of being held by the whole circumferential surfaces of the barrel holes 5 (the inner circumferential surfaces 5s) without any gap. As a result, the sleeves 8 can be firmly fixed in the barrel holes 5.

On the other hand, the fastening devices 12 are unfastened from the fastening holes 11. That is, when the fastening devices 12 are screwed in an opposite direction, the screw portions 11c move in a direction away from the head portions 12a of the fastening devices 12 with the rotation of the axial portions 12b of the fastening devices 12 in the opposite direction. At this time, with the screw portions 13c, the peripheral structures of the screw portions 11c also move away in the same direction. The space between the cutout surfaces 6s is thereby widened. Because of the widening of the space, the deformed barrel main bodies 2 are elastically restored to the initial shape.

When the barrel main bodies 2 are restored to the initial shape, the inside diameter of the barrel holes 5 (the inner circumferential surfaces 5s) is expanded. This dissolves the state in which the barrel holes 5 (the inner circumferential surfaces 5s) and the sleeves 8 are in close contact with each other. As a result, the sleeves 8 become removable from the barrel holes 5.

[Advantageous Effects of Present Invention]

According to the present embodiment, the fixing mechanism is provided. The sleeves 8 thereby can be incorporated and fixed in the barrel holes 5 (the barrel main bodies 2) without the application of a method of incorporation such as shrink-fitting or cooling-fitting.

According to the present embodiment, the hollow sleeves 8 having a cylindrical shape are removably incorporated into the barrel main bodies 2 (barrel). This alone enables the cylinder as a hollow duct, into which screws are rotatably inserted, to be integrated into the barrel main bodies 2 (barrel).

According to the present embodiment, the inside diameter of the barrel holes 5 of the barrel main bodies 2 is set to be equal to or slightly greater than the outside diameter of the sleeves 8. The sleeves 8 thereby can be removably inserted (incorporated) into the barrel holes 5 easily and smoothly. As a result, the cost required to incorporate the sleeves 8 into the barrel holes 5 can be greatly reduced.

According to the present embodiment, the slit is formed to divide the inner circumferential surfaces 5s of the barrel holes 5. In this case, it becomes easier to elastically deform the barrel main bodies 2. It becomes easier to expand and deform the barrel holes 5. The barrel holes 5 are thereby expanded and deformed when the sleeves 8 are incorporated into the barrel holes 5. As a result, the sleeves 8 can be removably incorporated into the barrel holes 5 easily and smoothly.

According to the present embodiment, in the fixing mechanism, the fastening devices 12 are screwed and fastened. That is, the space of the slit 6 (the gap or the space between both the cutout surfaces 6s) is narrowed. The barrel main bodies 2 are thereby deformed from the initial shape. As a result, the barrel holes 5 (the inner circumferential surfaces 5s) can be brought into close contact with the sleeves 8 without any gap. At this time, the sleeves 8 are kept in the state of being held by the whole circumferential surfaces of the barrel holes 5 (the inner circumferential surfaces 5s) without any gap. In this manner, the sleeves 8 can be firmly fixed in the barrel holes 5.

According to the present embodiment, in the fixing mechanism, the fastening devices 12 are unfastened. That is, the space of the slit 6 (the gap or the space between both the cutout surfaces 6s) is widened. The barrel main bodies 2 are thereby restored to the initial shape. As a result, the state in which the barrel holes 5 (the inner circumferential surfaces 5s) and the sleeves 8 are in close contact with each other is resolved. Thus, the sleeves 8 become removable from the barrel holes 5. It becomes possible to replace the sleeves 8 only.

According to the present embodiment, the positioning mechanism is applied. In the barrel blocks (the barrel main bodies 2), the orientations of the sleeves 8 incorporated in the barrel holes 5 thereby can be aligned with each other in the same direction. The cylinder in which the cylinder paths 9a and 9b continue straight thereby can be formed easily and precisely in a state in which the barrel blocks 1 (the barrel main bodies 2) are integrated.

According to the present embodiment, the contours of the outer circumferential surfaces 8s of the sleeves 8 are cylindrical. In this case, a lathe turning method can be applied to process the outer circumferential surfaces 8s of the sleeves 8. The lathe turning method is a technique of cutting the outer circumferential surfaces 8s of rotated workpieces (that is, the sleeves 8) circularly. The efficiency in manufacturing the sleeves 8 thereby can be dramatically improved.

Modification

In the above-described embodiment, the slit 6 (the gap or both the cutout surfaces 6s) having an even and flat shape is disposed along a center line (not shown in the figures). The center line refers to a segment connecting the center of the bottom surface 4s of the one flange 4a and the center of the bottom surface 4s of the other flange 4b in a straight line. The centers refer to positions at which the bottom surfaces 4s of the flanges 4a and 4b are each divided into two along a longitudinal direction. Thus, in the above-described embodiment, the introduction port 7a and the discharge port 7b are provided at positions avoiding the center line.

Figure 5:
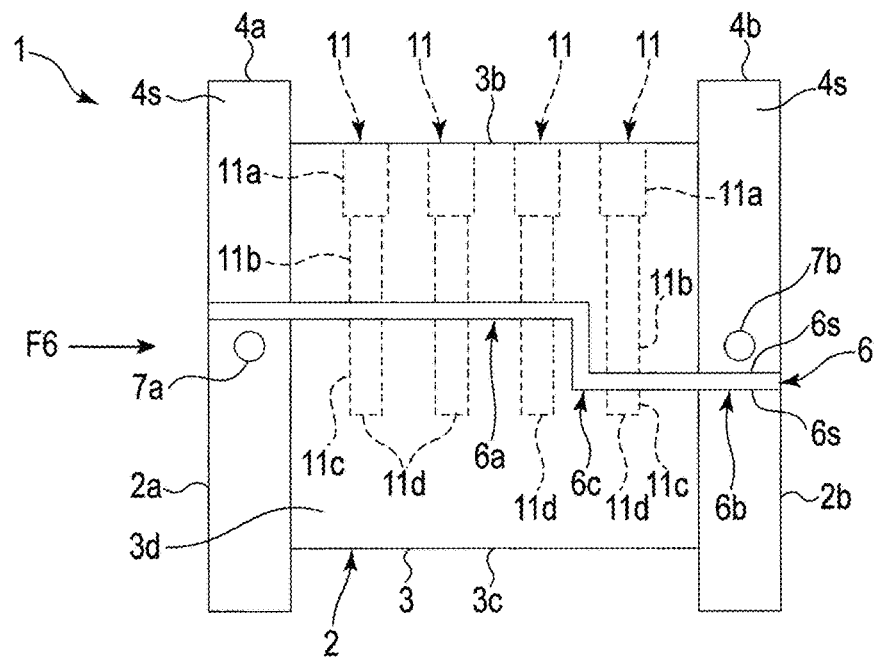
FIG. 5 is a bottom view of the liner-type barrel according to a modification.
Figure 6:
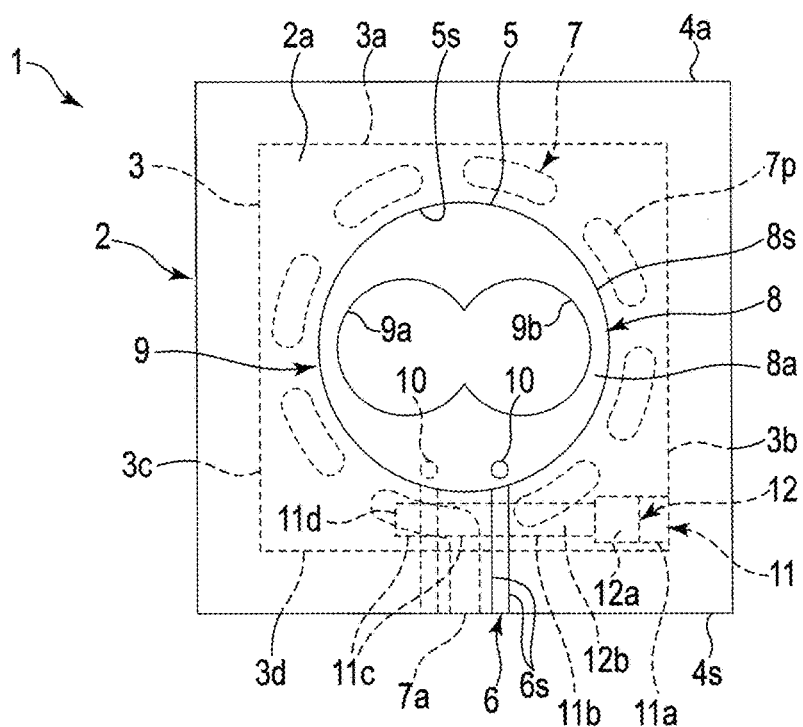
FIG. 6 is a side view from a direction F6 of FIG. 5.

In contrast, in the present modification, the case where the introduction port 7a and the discharge port 7b are disposed along the center line is assumed. In this case, the slit 6 (the gap or both the cutout surfaces 6s) is provided at a position avoiding the center line. The slit 6 (the gap or both the cutout surfaces 6s) is formed into an uneven crank shape. As shown in FIG. 5 and FIG. 6, the slit 6 (the gap or both the cutout surfaces 6s), for example, can be formed to comprise a first slit portion 6a, a second slit portion 6b, and a crank portion 6c.

The first slit portion 6a is formed from the bottom surface 4s of the one flange 4a to a middle of the bottom surface 3d of the barrel main body 2. The first slit portion 6a is provided at a position avoiding the center line. The first slit portion 6a extends straight continuously parallel to the center line.

The second slit portion 6b is formed from the bottom surface 4s of the other flange 4b to a middle of the bottom surface 3d of the barrel main body 2. The second slit portion 6b is provided at a position avoiding the center line. The second slit portion 6b extends straight continuously parallel to the center line.

The first slit portion 6a and the second slit portion 6b are disposed on both sides of the center line. In this case, the crank portion 6c is formed to connect the first slit portion 6a and the second slit portion 6b to each other at a middle of the bottom surface 3d of the barrel main body 2. The crank portion 6c continues across the center line.

According to the present modification, the slit 6 (the gap or both the cutout surfaces 6s) are formed into an uneven crank shape. The introduction port 7a and the discharge port 7b thereby can remain at positions along the center line, for example, positions adapted to existent facilities. As a result, cooling water can be introduced into and discharged from the cooling water path 7 (the duct 7p) while the existent facilities are used as they are. The other structures and advantageous effects are the same as those of the above-described embodiment, and thus a description thereof is omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

REFERENCE SIGNS LIST

1 . . . Barrel Block, 2 . . . Barrel Main Body, 5 . . . Barrel Hole, 5s . . . Inner Circumferential Surface, 6 . . . Slit, 6s . . . Cutout Surface, 7 . . . Cooling Water Path, 8 . . . Sleeve, 11 . . . Fastening Hole, 12 . . . Fastening Device

What is claimed is:

1. A barrel block comprising:
    a barrel main body comprising:
        two end surfaces facing each other,
        an outer surface covering a space between the end surfaces, and
        an inner circumferential surface of a barrel hole extending straight to penetrate the space between the end surfaces,
        the barrel main body being further formed to have an outline of a cubical or rectangular parallelepiped shape comprising a slit formed by cutting out a part from the outer surface, which is continuously integrated, to the inner circumferential surface, which has a cylindrical shape, to divide the inner circumferential surface along the space between the end surfaces, the slit comprising two cutout surfaces remaining after the part of the outer surface is cut out and facing each other with a space between;

a hollow sleeve removably incorporated into the barrel hole and comprising an outer circumferential surface having a cylindrical shape; and a fixing mechanism configured to fix the sleeve in the barrel hole, the fixing mechanism being configured to bring the inner circumferential surface of the barrel hole into close contact with the sleeve without any gap by inserting and fastening a fastening device into a fastening hole penetrating the slit from an outer surface of the barrel main body, thus narrowing the space between the cutout surfaces and deforming the barrel main body; and a cooling water path formed continuously to surround the barrel hole and configured to cool the barrel main body, the cooling water path comprising one continuous pipe including an introduction port configured to introduce cooling water into the cooling water path and a discharge port configured to discharge the cooling water passing through the cooling water path, wherein the slit is formed at a position avoiding the cooling water path, with the introduction port and the discharge port disposed on opposite sides of the slit.

2. The barrel block of claim 1, wherein the fixing mechanism comprises:

one or more fastening holes extending from the outer surface of the barrel main body to penetrate the two cutout surfaces of the slit; and one or more fastening devices removably inserted into the fastening holes.

3. The barrel block of claim 2, wherein the fastening holes are formed at positions avoiding the cooling water path.

4. The barrel block of claim 2, wherein in the fixing mechanism, when the fastening devices are inserted and fastened into the fastening holes, the space between the cutout surfaces is narrowed to deform the barrel main body having an initial shape.

5. The barrel block of claim 4, wherein when the barrel main body having the initial shape is deformed, the sleeve is brought into close contact with the inner circumferential surface of the barrel hole without any gap to fix the sleeve in the barrel hole.

6. The barrel block of claim 4, wherein in the fixing mechanism, when the fastening devices are unfastened from the fastening holes, the space between the cutout surfaces is widened to restore the deformed barrel main body to the initial shape.

7. The barrel block of claim 6, wherein when the deformed barrel main body is restored to the initial shape, the sleeve becomes removable from the barrel hole.

8. The barrel block of claim 1, wherein the sleeve is set to a length equal to a distance between the end surfaces of the barrel main body.

9. The barrel block of claim 1, wherein the sleeve is set to a length which makes the sleeve slightly project from the end surfaces of the barrel main body.

10. The barrel block of claim 1, comprising a positioning mechanism for incorporating the sleeve into the barrel hole in a fixed orientation.

* * * * *